Oct. 14, 1924.
J. E. KENNEDY
TELLTALE FOR PNEUMATIC TIRES
Filed Dec. 17, 1919   2 Sheets-Sheet 2
1,511,280
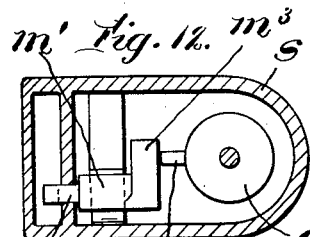
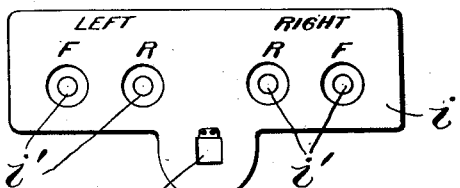
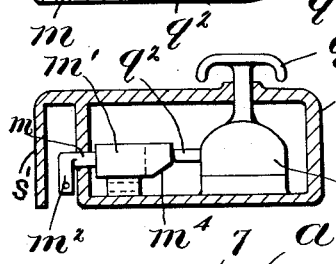
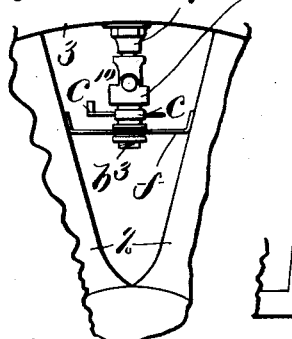
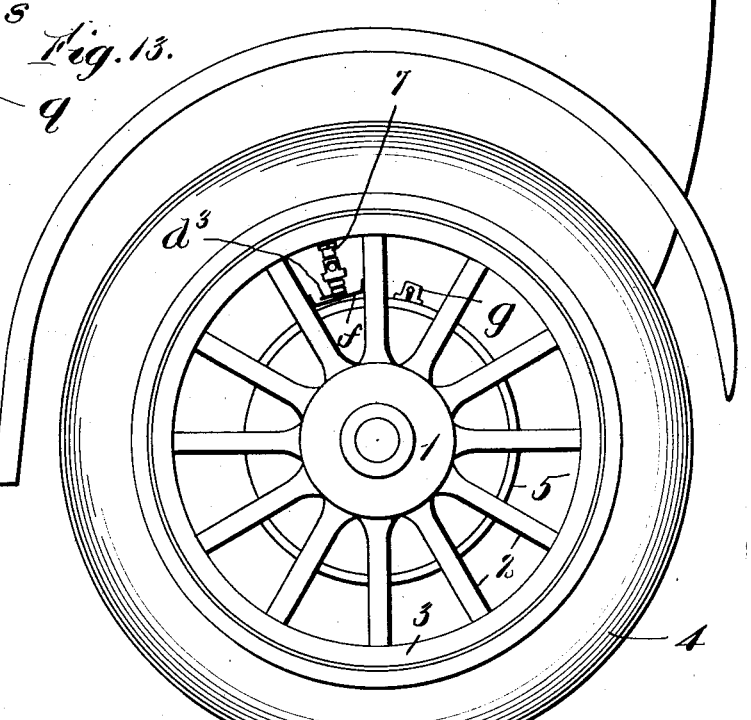
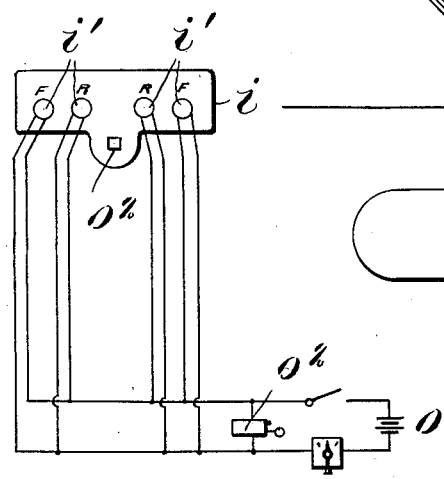
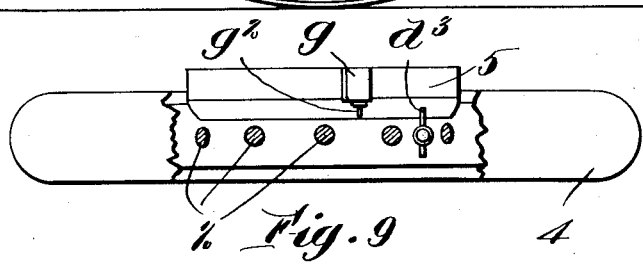
Inventor:
John E. Kennedy
by Geo. N. Goddard atty.

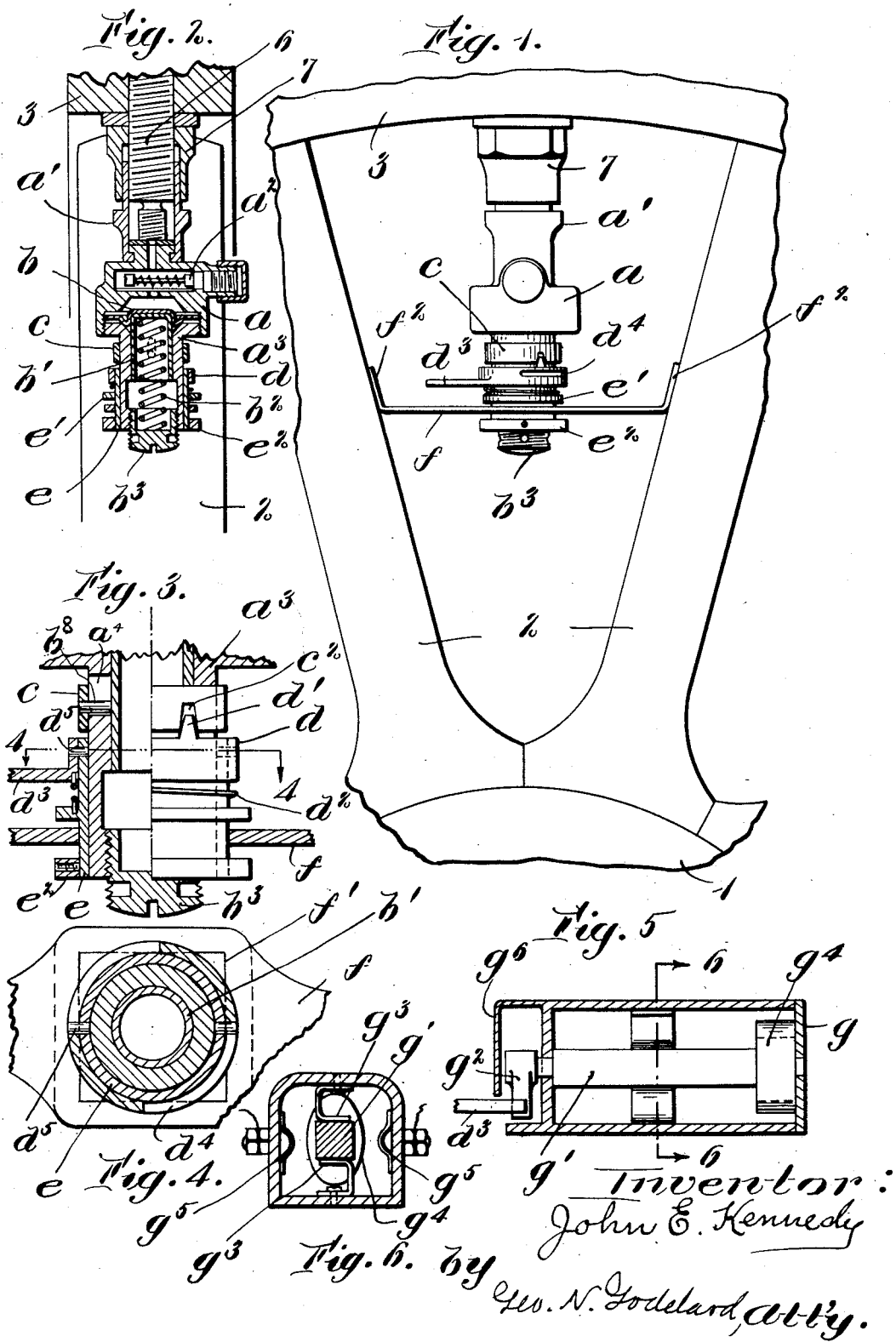

Patented Oct. 14, 1924.

1,511,280

UNITED STATES PATENT OFFICE.

JOHN E. KENNEDY, OF GLENS FALLS, NEW YORK.

TELLTALE FOR PNEUMATIC TIRES.

Application filed December 17, 1919. Serial No. 345,678.

*To all whom it may concern:*

Be it known that I, JOHN E. KENNEDY, a British subject, and resident of Glens Falls, in the county of Warren and State of New York, have invented certain new and useful Improvements in Telltales for Pneumatic Tires, of which the following is a specification.

This invention comprises an improvement in automatic tell-tales for pneumatic tires whose purpose is to indicate plainly by a suitable signal easily noticed by the driver the deflation of the tire to any predetermined point below which further loss of pressure is likely to result in injury to the tire or in too rapid wear thereof.

In my earlier application for United States patent filed September 19, 1919 Serial No. 325,038 I have disclosed an improvement in tell-tales mounted wholly upon the wheel structure, but the present invention is to be distinguished from that one not only by novel features of mechanical construction but chiefly by the arrangement in which the alarm mechanism is mounted on the vehicle itself that is some part of either the frame or body while the actuating member which causes the alarm to sound or signal is mounted on the wheel so as to be under control of or responsive to the air pressure in the tire, and to show a fall of pressure.

With the present arrangement the signaling device which indicates the fall of air pressure to the critical point may be operated either through mechanically actuated means or by electrically actuated means. In the latter case provision can be made for sounding an audible alarm and at the same time displaying an electric signal which gives visible indication to the driver of the fall of pressure, and may also indicate at the same time which particular tire of the vehicle is at fault.

Two direct advantages are secured by the use of this invention, namely, seasonable warning is given that further use of the tire without raising the pressure is likely to result in injury and, secondly, by reason of this automatic signal it becomes practicable and safe to carry a materially lower initial air pressure in the tires than heretofore since a smaller margin of excess pressure over the minimum may be safely used in connection with such alarm.

These and other features of the invention will be described in this specification and will be defined in the claims annexed.

In the accompanying drawings I have illustrated two preferred forms embodying the principles of this invention in which—

Figure 1 is an enlarged detail showing the arrangement of the alarm actuating member that is controlled by the air pressure.

Figure 2 is a longitudinal sectional detail thereof at right angles to the plane of Figure 1.

Figure 3 is an enlarged detail of a portion of the piston chamber in sectional cross section at right angles to Figure 2.

Figure 4 is a cross section on the plane 4—4 of Figure 3.

Figures 5 and 6 are central sectional views taken at right angles of the electric switch for controlling the signaling device.

Figure 7 is front elevation of the panel or plate on the dash which carries the electric signaling device.

Figure 8 is an elevation showing the vehicle wheel equipped with this invention.

Figure 9 is a plan view thereof partly in cross section.

Figure 10 is a diagrammatic illustration of the electric wiring.

Figures 11, 12 and 13 are detail views illustrating a modified construction and arrangement in which the alarm is sounded by mechanically instead of electrically operated means.

In the drawings, 1, designates the hub; 2, the spokes; 3, the rim; 4, the pneumatic tire; 5, the brake band; 6, the valve stem of the tire; and 7, the clamping nut by which the valve stem is clamped to the wheel rim according to the usual and well-known practice.

In the practice of this invention I provide a valve chamber $a$ which is connected with the free end of the valve stem by a swiveled coupling member $a'$ and which has an air inlet passage controlled by an air retaining valve $a^2$ suitable ports being provided on opposite sides of the inlet passage in communication respectively with the pneumatic tube and the piston chamber $a^3$ which is attached to the inlet valve chamber $a$ by screw threaded engagement. A flexible diaphragm $b$ of rubber or the like is clamped between members $a$, $a^3$ and within the piston chamber $a^3$ is placed a hollow piston $b'$ which is normally thrust against the diaphragm $b$ by the pressure of the spring $b^2$ whose farther ends press against the adjustable plug $b^3$ thereby permitting the tension of the spring and the position of the piston to be varied. The piston chamber is provided on opposite sides with slots $a^4$ through which project pins $b^8$ which attach the piston to an external slidable ring $c$ surrounding the piston chamber. Beyond the slide ring $c$ is mounted a swiveled or rotatable collar $d$ which is provided on one side with a projection or tooth $d'$ to engage a notch $c^2$ in the slide ring $c$ by which engagement the rotation of the member $d$ is prevented. A torsion spring $d^2$ having one end attached to the member $d$ normally tends to rotate the collar $d$ about its axis. The collar $d$ is also provided with a projecting finger $d^3$ arranged to extend in the plane of the wheel structure when the tooth $d'$ is engaged with the notch $c^2$ and to project beyond the spokes of the wheel at practically right angles thereto, when, owing to a fall of air pressure the ring $c$ moves away from engagement with the tooth $d'$ and allows the torsion spring $d^2$ to act. To keep the collar $d$ from longitudinal displacement it is provided with circumferential slots $d^4$ engaging pins $d^5$ which project through the slot from the inner fixed member thereby limiting the rotative movement of the collar $d$ when released and serving to sustain the shock or thrust against said collar when the arm or finger $d^3$ strikes against the signal controlling device hereinafter to be explained.

To reenforce and support the free end of the piston chamber projecting from the valve stem without strain on the valve stem, I provide a cap $e$ which is polygonal in cross section at its outer end and cylindrical at the point where it is surrounded by the collar $d$. This cap, intermediate of its ends, has a projecting flange $e'$ and is also provided with a removable ring $e^2$ secured to its outer end by means of a set screw so as to form between them an annular channel to receive the supporting bridge or strut $f$ whose central portion is provided with a polygonal orifice to receive or fit over the cap $e$ and whose ends $f^2$ are secured to the adjacent spokes. With this construction it is possible to disconnect the valve stem coupling member $a'$ to permit the substitution of the new tire while leaving the piston chamber and its adjacent parts retained in position for reattachment to the valve stem of the new tire.

The signaling device may be, and usually will be, in the form of an audible alarm and in this case there is associated with it a supplemental signaling device arranged on the dash to be visible from the driver's seat to indicate which of the four tires is at fault. It will, therefore, be seen that any suitable type of signaling device may be used.

I will first describe the electrically operated device. In this form there is mounted on some relatively stationary part of the car body or frame, such for example as shown in Figure 8 as a brake band, an electric switch as shown at $g$. Any suitable form of switch may be used but I have shown in Figures 5 and 6 a simple and convenient construction adapted to this purpose. The switch shown comprises a water-tight casing $g$ provided with a central shaft $g'$ journalled in the opposite end walls of the switch casing and having the end adjacent to the wheel projecting through the end wall to which projecting end is secured a lever $g^2$. The shaft $g'$ is preferably squared to be engaged by two knife spring members $g^3$ which act not only to maintain the shaft in a definite angular position but also have the function of giving a quick throw to the switch shaft when it has been turned beyond the dead center by the finger $d^3$ when it projects beyond the spokes of the wheel in position to engage the lever $g^2$ and cause partial rotation of the shaft. Mounted on the shaft $g'$ is the switch member proper which is shown in open position in Figure 6 but which when turned at right angles to that position forms a contact between the terminals $g^5$, $g^5$ for the purpose of closing an electric circuit. For convenience the switch casing is made of non-conducting material and is also provided with a hood $g^6$ projecting over the lever in position to protect the lever from accidental displacement which might be caused by one washing the car.

The signaling device in this case is shown on a panel $i$ attached to the dash board of the car and is provided with four openings suitably designated to indicate the different wheels of the car behind which are arranged preferably small electric lamps $i'$ each one of which is placed in a separate circuit leading to the battery $o$ and its switch $g$ so that, when the switch on any particular wheel is actuated by the pressure controlled actuating member, the lamp corresponding thereto is illuminated to indicate the fall of pressure. An electric bell or buzzer $o^2$ is arranged in circuit with all switches so as to sound an audible alarm whenever any individual switch is closed.

In Figures 11, 12 and 13 I have illustrated a mechanically actuated audible alarm under the control of a member which is actuated by a trip or actuating member located on the wheel which may be the same in construction and arrangement as the actuating member already described or may be modified in the manner shown in Figure 11.

In either form of the device the slide ring $c$ instead of operating through the medium of a torsion collar as previously described may itself be provided with a projecting finger $c^{10}$ which normally projects beyond the inside face of the wheel spokes as shown in Figure 12 but at a level out of alignment with the level of the alarm controlling device mounted on the brake band. With the fall in pressure the slide ring $c$ with its finger $c^{10}$ moves toward the rim of the wheel in position to engage the arm or finger $m^2$ of the controlling member or cam $m'$ which is pivoted on the shaft $m$ with its face opposite the wheel in position to receive the outer thrust of the alarm release pin $q^2$ projecting beyond the alarm bell $q$. The shaft $m$ is journalled in a protective water proof housing $s$ and has a projecting end carrying the arm $m^2$ which projects downwardly when the lateral extension $m^3$ of the bell controlling member is in operative engagement with the end of the projecting bell pin $q^2$. The arm $m^2$ is engaged by the trip or actuating member $d^3$ when the fall of air pressure allows the trip to move far enough toward the wheel rim. A knife spring $t$ is in engagement with the squared portion of the shaft $m$ just as in the case of the switch shaft above described to retain the shaft in correct angular position whether in engaging position with the bell pin $q^2$ or in bell releasing position. The housing $s$ is provided with a suitable hood $s'$ to prevent the external arm $m^2$ from being displaced when washing the car. As the bell $q$ is preferably enclosed within the housing $s$, I provide it with a central winding button $q^3$ which is arranged outside of the casing by a connecting pin passing through a bearing in the top of the casing, the button being concaved to overlap the bearing in order to shed water. The underside of the pin engaging extension $m^3$ is bevelled so that when the bell controlling member is reset to normal position it forces the bell pin back into position to lock the bell mechanism after which the bell mechanism may be rewound through the agency of the button $q^3$.

After the valve stem attachment is placed on the valve stem the tire is inflated through the valve inlet passage to the desired degree of pressure. The collar $c$ is then set about midway of the slots by means of the spring adjusting plug $b^3$ and in that position has engagement through the notch $c^2$ with the tooth $d'$ the switch lever being inspected to be sure that it is in position to indicate that the switch is opened which will be the case when the switch lever or arm is in position to be operated by the trip member on the valve stem.

As the air pressure may fall while the car is standing in the garage, when the current is off, it is desirable to give some visible and noticeable indication of such fall and to that end the trip collar on the piston chamber may be provided with an arm opposite the trip arm $d^3$ which will project beyond the outer plane of the spokes to plainly show such fall of pressure before the driver gets into the car, as shown in Fig. 9 and Fig. 11.

What I claim is:

1. In an automatic tell-tale for pneumatic vehicle tires, the combination with the valve stem of the tire, of a valved casing attachable thereto, a yielding spring-pressed member mounted therein to be positioned according to the air pressure in the tire, and a detent connected therewith to be moved thereby, a trip member, means for normally exerting a torque upon said trip member to cause rotation, the trip member and the detent being normally interlocked to prevent the rotation of the trip at normal air pressure and to be disengaged when the air pressure falls to a predetermined point, and a signal controlling device mounted on the vehicle adjacent to the path of revolution of the tire stem in position to be engaged and operated by said trip when the latter is released from its engagement with the said detent, substantially as described.

2. In an automatic tell-tale for pneumatic tires, the combination of a hollow valved casing secured to the stem of the tire, a piston mounted therein to move axially of the tire stem and normally balanced by the opposing air pressure and a yielding spring, an externally mounted trip member arranged to be rotated about the axis of the tire stem, and a detent operatively connected with said piston to move axially therewith when the air pressure falls, said detent having separable interlocking connection with said trip member and acting to prevent the rotation of said trip member at normal air pressure and to release said trip member when the air pressure falls whereby the trip may rotate into position to cause the operation of an alarm on the vehicle, substantially as described.

In witness whereof, I have subscribed the above specification.

JOHN E. KENNEDY.